(12) United States Patent
Satoh et al.

(10) Patent No.: US 9,121,873 B2
(45) Date of Patent: Sep. 1, 2015

(54) ELECTRONIC CIRCUIT COMPONENT AUTHENTICITY DETERMINATION METHOD

(71) Applicant: NATIONAL INSTITUTE OF ADVANCED INDUSTRIAL SCIENCE AND TECHNOLOGY, Chiyoda-ku (JP)

(72) Inventors: Akashi Satoh, Tsukuba (JP); Toshihiro Katashita, Tsukuba (JP)

(73) Assignee: NATIONAL INSTITUTE OF ADVANCED INDUSTRIAL SCIENCE AND TECHNOLOGY, Chiyoda-Ku, Tokyo (JP)

( * ) Notice: Subject to any disclaimer, the term of this patent is extended or adjusted under 35 U.S.C. 154(b) by 440 days.

(21) Appl. No.: 13/746,761

(22) Filed: Jan. 22, 2013

(65) Prior Publication Data

US 2013/0127442 A1 May 23, 2013

Related U.S. Application Data

(63) Continuation of application No. PCT/JP2011/065055, filed on Jun. 30, 2011.

(30) Foreign Application Priority Data

Jul. 29, 2010 (JP) ................................. 2010-170179

(51) Int. Cl.
*H01L 23/544* (2006.01)
*G01R 25/00* (2006.01)
(Continued)

(52) U.S. Cl.
CPC .............. *G01R 25/00* (2013.01); *G06F 21/44* (2013.01); *G06F 21/73* (2013.01); *G06F 2221/2129* (2013.01)

(58) Field of Classification Search
None
See application file for complete search history.

(56) References Cited

U.S. PATENT DOCUMENTS

2007/0220263 A1* 9/2007 Ziener et al. .................. 713/176
2008/0279373 A1 11/2008 Erhart et al.
(Continued)

FOREIGN PATENT DOCUMENTS

JP 2001-265000 A 9/2001
JP 2002-537646 A 11/2002
(Continued)

OTHER PUBLICATIONS

International Search Report (PCT/ISA/210) issued on Aug. 9, 2011, by the Japanese Patent Office as the International Searching Authority for International Application No. PCT/JP2011/065055.
(Continued)

*Primary Examiner* — Melissa Koval
*Assistant Examiner* — Courtney McDonnough
(74) *Attorney, Agent, or Firm* — Buchanan Ingersoll & Rooney PC

(57) ABSTRACT

This invention provides an electronic circuit component authenticity determination method capable of determining whether an electronic circuit component is a component manufactured by an authorized manufacturer. The electronic circuit component is operated under a predetermined condition at the time of manufacturing or initialization of the electronic circuit component. The waveform of power consumption or an electromagnetic wave at the time of the operation is measured and stored as first waveform data. An authenticity determination target electronic circuit component is operated under the predetermined condition. The waveform of power consumption or an electromagnetic wave is measured and temporarily stored as second waveform data. The stored first waveform data is compared with the second waveform data. It is determined that the electronic circuit component is a genuine when the waveform data match. It is determined that the electronic circuit component is a counterfeit product when the waveform data are different.

10 Claims, 3 Drawing Sheets

(51) Int. Cl.
*G06F 21/44* (2013.01)
*G06F 21/73* (2013.01)

(56) References Cited

U.S. PATENT DOCUMENTS

2009/0100392 A1    4/2009  Ivaldi
2010/0237854 A1*   9/2010  Kumhyr et al. ............ 324/158.1

FOREIGN PATENT DOCUMENTS

| JP | 2009-147306 A | 7/2009 |
| JP | 2009-246267 A | 10/2009 |
| JP | 2010-120079 A | 6/2010 |

WO    WO 00/49538  A1    8/2000

OTHER PUBLICATIONS

SEMI T20-1109, "Specification for Authentication of Semiconductors and Related Products", downloaded on Dec. 4, 2012, http://ams.semi.org/ebusiness/standards/SEMIStandardDetail.aspx?ProductID=211&DownloadID=1507.
Pappu, "Physical one-way functions", PhD thesis, MIT, Mar. 2001, http://pubs.media.mit.edu/pubs/papers/01.03.pappup hd.powf.pdf.
Gassend, et al., "Silicon physical random functions", Proc. 9th ACM Conference on Computer and Communication Security (CCS' 02), MIT, Nov. 2002, pp. 148-160.

* cited by examiner

F I G. 2
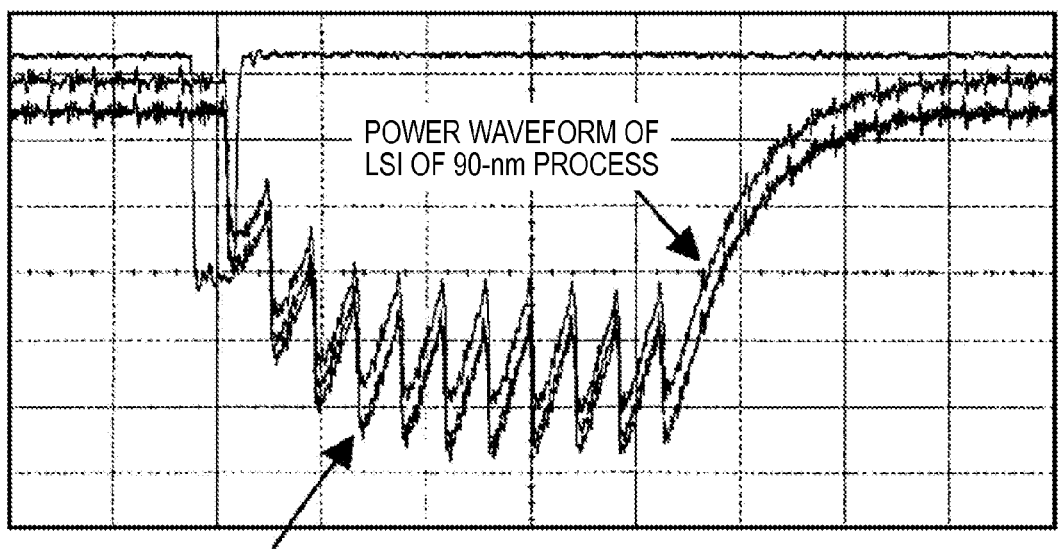

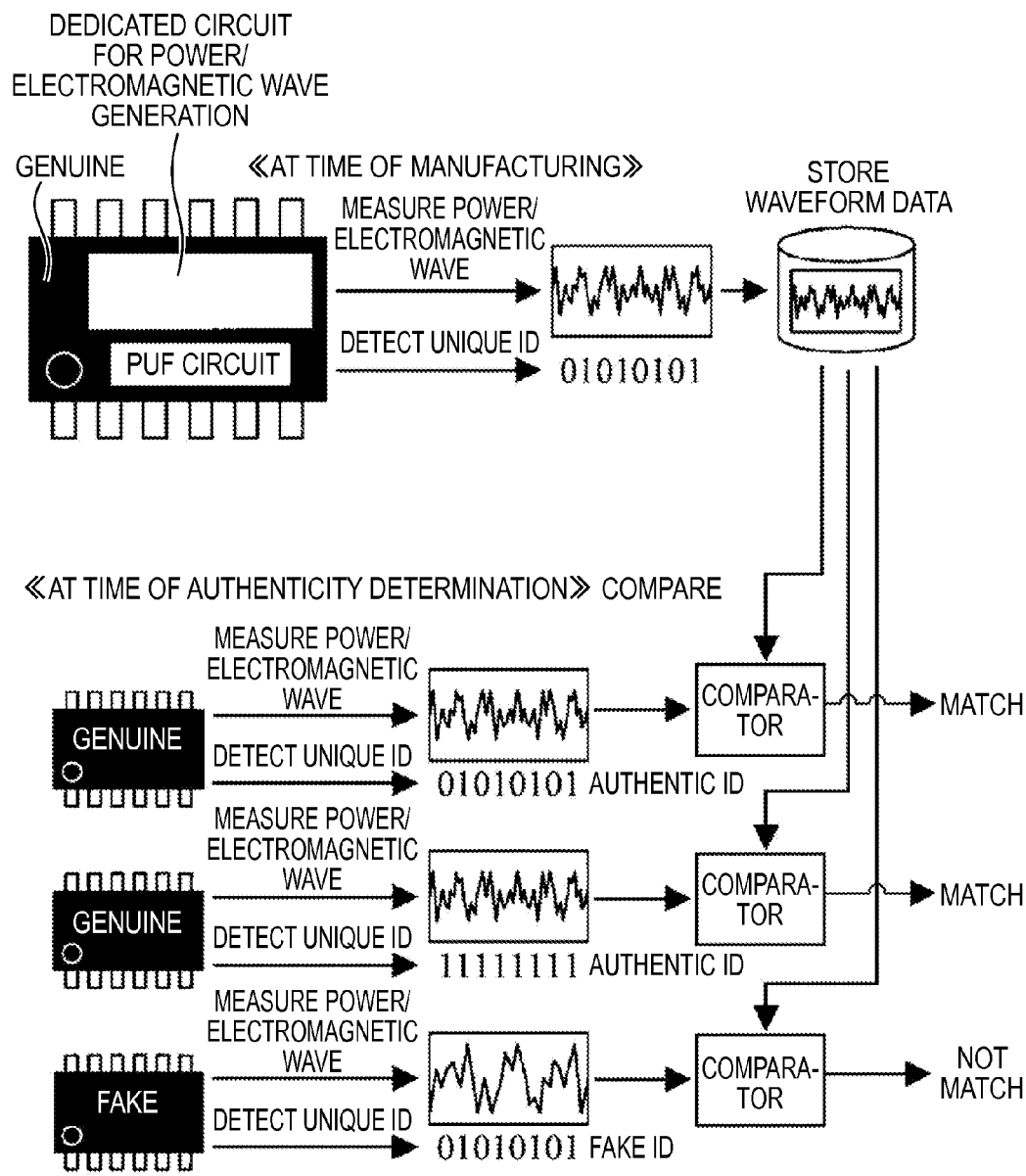

ELECTRONIC CIRCUIT COMPONENT AUTHENTICITY DETERMINATION METHOD

TECHNICAL FIELD

The present invention relates to an electronic circuit component authenticity determination method capable of determining whether a commercially distributed electronic circuit component is a component manufactured by an authorized manufacturer of the electronic circuit component.

BACKGROUND ART

Technologies for manufacturing electronic circuit components and representative LSI products thereof have become widespread, and manufacturing is shifting to low-cost regions in Southeast Asia and the like. Up to the 1990s where manufacturing was conducted by only a few specialized makers with advanced technology, the products were mainly distributed through legitimate channels. For this reason, problems caused by the commercial distribution of counterfeit products and shoddy items did not surface.

If logical design data of an LSI product is available, a circuit of the same logical operation can be made even according to a different manufacturing process (factory). Instances where counterfeit products are made by reverse-engineering an electronic circuit component, for example, an LSI product of an advanced technology have also exponentially grown in number. Second-hand items and defective items that should have been discarded in the manufacturing process are sometimes included, in addition to the distribution of counterfeit products. In particular, since an expensive LSI product worth several hundreds of dollar per chip is not a rarity, counterfeiting is a great benefit and would be likely to further increase. The need for countermeasures is imperative.

It is easy to determine the authenticity of a counterfeit product that only copies the outer appearance but cannot operate at all. However, a counterfeit product that has poor quality but performs the same logical operation as that of a genuine is difficult to discriminate.

The counterfeit electronic circuit components certainly incur financial damage and pose a threat to the safety of users using products as well, leading to a problem of credibility of the product maker. Hence, it is especially important to discriminate a counterfeit product that looks like an authentic item capable of operating correctly.

Whether an item is an authentic item made at an authorized factory can be determined by opening the package and checking the manufacturing process, as a matter of course. However, the cost of such a destructive inspection is high, and the destroyed authentic item is unusable. There is also a trick to selling counterfeit products that are mixed among authentic items, and a sampling inspection alone may fail in finding the counterfeit products. Hence, it is very important to develop a technique for nondestructively determining the authenticity of an LSI product.

To prevent the infiltration of imitations in the trade stream, the industrial organization SEMI (Semiconductor Equipment and Materials International) is pushing forward an ISO of "T20" specifications of traceability technologies (NPL 1).

In "T20", a third-party certification authority issues unique IDs (identification data). Semiconductor makers add the IDs to products and submit the databases of products managed by the IDs to the third-party certification authority. The user of an LSI product can confirm the authenticity by inquiring of the third-party certification authority about the ID added to the product.

However, adding and managing IDs cost several cents/piece when issuing an enormous number of IDs. This is not problematic for, for example, expensive processors that are worth several hundreds of dollar, but greatly increases the cost of LSI products priced at only several dollars. As for the ID form, a two-dimensional barcode is expected to be used on the package of an LSI product, and a hologram or an RFID (wireless ID tag) for a packaging box. However, it cannot prevent counterfeit of the barcode, hologram, or RFID.

There have also been developed a technique for directly marking an ID in an LSI chip by laser (PTLs 1 and 2), but not in the package or packaging box of an LSI product. This technique is suitable for managing silicon wafers or bare chips. However, once an LSI chip is packaged, its authenticity can be confirmed only by destructive inspection. A technique of printing dots on an LSI product by Ag nanoink and non-destructively reading the dots by X-ray fluoroscopy raises fears of an adverse effect of the ink on the LSI device (PTL 3). The laser marking or nanoink printing is also disadvantageous in needing an apparatus to perform special marking.

Studies on PUF (Physical Unclonable Function) are also making progress, which is a technique of converting a physical variation of LSI devices into digital data and using it as an ID, instead of writing an ID later (NPLs 2 and 3 and PTL 4).

Some PUF products use the fact that data in an SRAM takes a random value unique to the chip immediately after being powered on, and some products using the value as an ID are coming along.

PATENT LITERATURE

Non-Patent Literature

NPL 1: SEMI T20-1109, "Specification for Authentication of Semiconductors and Related Products" http://ams.semi-.org/ebusiness/standards/SEMIStandardDetail.aspx?ProductID=211&DownloadID=1507

NPL 2: R. S. Pappu, "Physical one-way functions," PhD thesis, MIT, March 2001, http://pubs.media.mit.edu/pubs/papers/01.03.pappuphd.powf.pdf.

NPL 3: N. Gassend, et al., "Silicon physical random functions", Proc. 9th ACM Conference on Computer and Communication Security (CCS' 02), pp. 148-160, November 2002.

Patent Literature

PTL 1: Japanese Patent Laid-Open No. 2001-265000
PTL 2: Japanese Patent Laid-Open No. 2010-120079
PTL 3: Japanese Patent Laid-Open No. 2009-246267
PTL 4: U.S. Patent Application Publication No. 2008/0279373

SUMMARY OF INVENTION

Technical Problem

As described above, among the techniques developed so far, no technique has been proposed that is easily usable for determining whether a commercially distributed electronic circuit component is a component manufactured by an authorized manufacturer that is a party concerned in development of the electronic circuit component.

For example, studies on a PUF circuit are proceeding. PUF products do not require any special ID write technique but require that IDs are individually measured and saving them to a database at the time of manufacturing. In addition, since the PUF products use a variation between devices, the future subject is to ensure the stability of IDs against a change in the environment such as the power source voltage or operation temperature.

The present invention implements identification data used for product authenticity determination, which
(1) can nondestructively identify an authentic item or a counterfeit product,
(2) uses no special manufacturing process that leads to an increase in the cost, and
(3) cannot be copied or peeled off from a component or LSI surface, unlike a barcode, and provides a mechanism capable of easily and properly identifying the authenticity of an electronic circuit component, that is, whether an electronic circuit component is a component distributed through a legitimate channel.

The present invention solves the above-described problems, and has as its object to provide an electronic circuit component authenticity determination method capable of determining whether a commercially distributed electronic circuit component is a component manufactured by an authorized manufacturer of the electronic circuit component.

Solution to Problem

In order to achieve the above-described object, an electronic circuit component authenticity determination method according to the present invention includes:

operating an electronic circuit component under a predetermined condition at a time of manufacturing or initialization of the electronic circuit component, measuring a waveform of one of power consumption and an electromagnetic wave at a time of the operation, and storing the waveform as first waveform data;

operating an authenticity determination target electronic circuit component under the predetermined condition, measuring a waveform of one of power consumption and an electromagnetic wave, and temporarily storing the waveform as second waveform data; and comparing the stored first waveform data with the second waveform data, determining that the electronic circuit component is a genuine when the waveform data match, and determining that the electronic circuit component is a counterfeit product when the waveform data are different.

In this case, the electronic circuit component is configured to include a circuit that operates under the predetermined condition and generates a power or electromagnetic waveform separately from a circuit of a primary function. Alternatively, the electronic circuit component is configured to operate all or some of circuits of a primary function, measure the power or electromagnetic waveform at the time of the operation, and store the waveform as the first waveform data. In the authenticity determination target electronic circuit component, the circuit that is provided separately for the primary function and generates the power or electromagnetic waveform, or all or some of the circuits of the primary function are operated under the predetermined condition, the power or electromagnetic wave form is measured as the second waveform data, and the second waveform data is compared with the stored first waveform data.

The electronic circuit component authenticity determination method according to the present invention may be configured to perform the comparison between the first waveform data and the second waveform data by extracted feature data after a predetermined feature has been extracted from the waveform data.

In this case, the electronic circuit component authenticity determination method is configured to perform the measurement of the waveform under the predetermined condition once or a plurality of times under a single or a plurality of predetermined conditions and store a plurality of waveform data as the first waveform data. Alternatively, the electronic circuit component authenticity determination method is configured to perform, for the authenticity determination target electronic circuit component, the measurement of the waveform under the predetermined condition once or a plurality of times under a single or a plurality of predetermined conditions and compare the second waveform data with the plurality of stored first waveform data.

As a second aspect of the present invention, an electronic circuit component that uses an electronic circuit component authenticity determination method is configured to comprise, as a circuit for authenticity determination of an electronic circuit component, a circuit that operates under a predetermined condition and generates a predetermined waveform separately from a circuit of a primary function. In this case, a ring oscillator, a linear feedback shift register, or the like is used as the circuit provided separately from the circuit of the primary function as the circuit for authenticity determination of the electronic circuit component, and the circuit is incorporated in the electronic circuit component.

Advantageous Effects of Invention

In the electronic circuit component authenticity determination method according to the present invention, waveform data at the time of the operation of the electronic circuit component is used as identification data.
(1) It is therefore possible to nondestructively identify an authentic item and a counterfeit product.
(2) It is also possible to incorporate a circuit for the electronic circuit component authenticity determination method without using any special manufacturing process that can lead to an increase in the cost and easily and properly determine whether an electronic circuit component is an authentic item.
(3) Since the waveform data used as identification data here cannot be copied or peeled off from a component or LSI surface, unlike a barcode, the safety and security against theft are high.

BRIEF DESCRIPTION OF DRAWINGS

FIG. 2 is a graph showing the power waveforms of AES encryption circuits of three types of LSI products; and FIG. 3 is a view for explaining an example of application of the electronic circuit component authenticity determination method according to the present invention to PUF.

DESCRIPTION OF EMBODIMENTS

Figure 1:
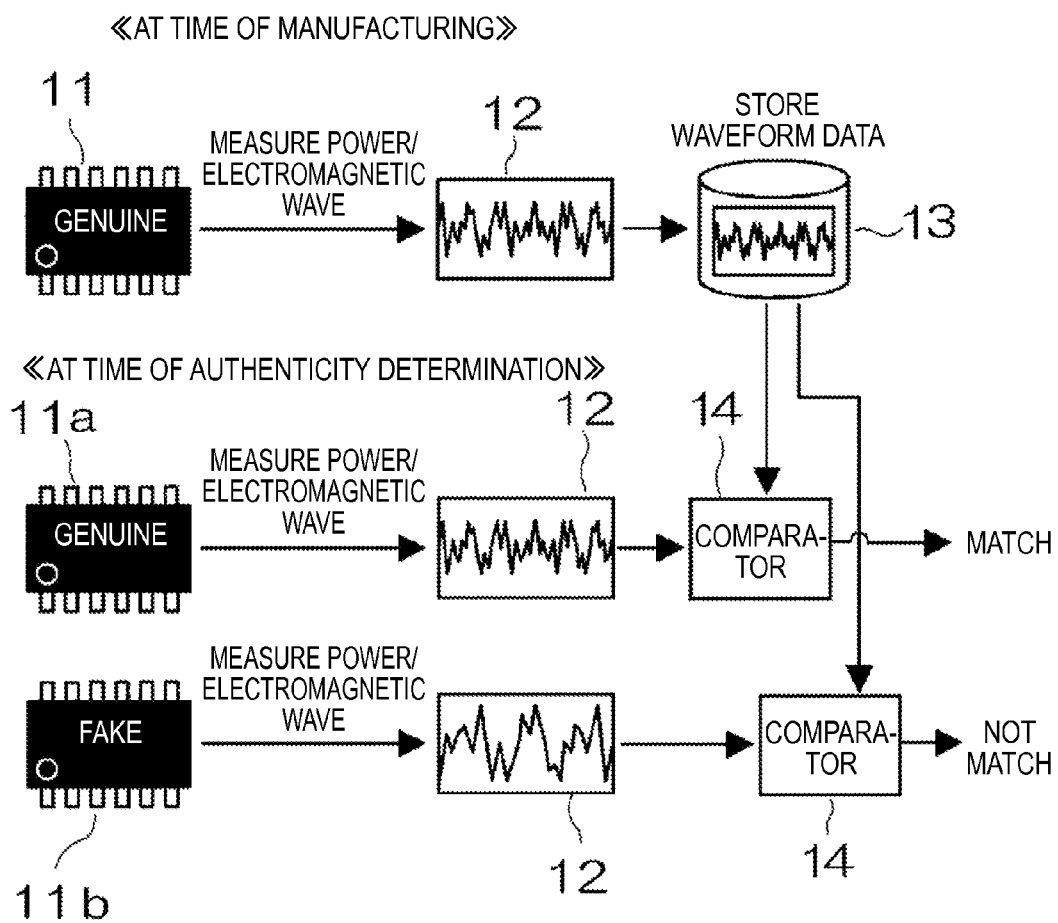
FIG. 1 is a view for explaining an electronic circuit component authenticity determination method according to the present invention.

A mode for carrying out the present invention will now be described based on an embodiment. FIG. 1 is a view for explaining a method of determining the authenticity of an LSI product that is an electronic circuit component according to the present invention. Referring to FIG. 1, reference numeral 11 denotes an LSI product of an electronic circuit component;

12, a measurement device that measures waveform data of the LSI product operated under a predetermined condition; 13, a storage device that stores the waveform data measured by the measurement device; and 14, a comparator that compares waveform data. Note that a control circuit that controls these elements is also provided, although not illustrated. An electronic circuit component authenticity determination apparatus including these elements is implemented by a computer system including an A/D converter and having an input/output port.

As shown in FIG. 1, during manufacturing or initialization of the LSI product 11 that is an electronic circuit component, the LSI product 11 is operated under a predetermined condition, and the waveform of the power consumption or electromagnetic wave at the time of the operation is measured using the measurement device 12. The measured waveform data is stored in the storage device 13 together with the data of the time at which the waveform data was measured and the data of the measurement condition.

An LSI product (11a or 11b) that is an authenticity determination target electronic circuit component is operated under the predetermined condition at the measurement time of the waveform data stored in the storage device 13 as the waveform data of the target LSI product, the waveform of the power consumption or electromagnetic wave at that time is measured by the measurement device 12. The measured waveform data is temporarily stored and input to one input terminal of the comparator 14. The waveform data stored in the storage device 13 as the waveform data of the target LSI product is input to the other input terminal of the comparator 14 as reference data for comparison. The comparator 14 compares the stored waveform data with the measured waveform data. If the data match, the LSI product is determined as a genuine. If the data are different, the LSI product is determined as a counterfeit product.

This will be described in more detail. As preparation processing, at the time of manufacturing or initialization an LSI product, the waveform of the power consumption or electromagnetic wave of the LSI product at the time of the operation is measured and stored as waveform data.

At this time, (1) one or a plurality of dedicated circuits are mounted in the LSI product to form a functional circuit that generates a waveform used as identification data for authenticity determination. Alternatively, wiring may be done to make only some of the circuits of the LSI product operate in addition to use of all primary functions of the LSI product.

(2) As the LSI product whose waveform data is to be measured and stored, one or a plurality of LSI products of the same type are used.

(3) When measuring the waveform of the power consumption or electromagnetic wave of the LSI product at the time of the operation, a single or a plurality of conditions are used in the measurement environment including the power source voltage, the operation temperature, and the measurement device.

(4) Measurement under each condition is performed once or a plurality of times.

(5) Measured waveform data is stored together with the data of the measurement condition directly or after having undergone feature extraction. The stored data is used later as identification data to determine the authenticity of commercially distributed LSI products.

(6) Since the processing time can be extracted from the measured waveform data, the LSI may be caused to output a signal to be used to measure the processing time. This processing time may be used as identification data to determine the authenticity of LSI products.

Next, in authenticity determination processing, the LSI product to be subjected to authenticity determination is operated under the predetermined condition, like at the time of manufacturing or initialization. The waveform of the power consumption or electromagnetic wave at that time is measured and compared with the waveform data already measured and stored at the time of measurement of the LSI product. The LSI product is determined as a genuine if the data match, or as a counterfeit product if the data are different. It is hardly conceivable that the compared waveform data completely match. Practically, a genuine and a counterfeit product are discriminated based on the degree of matching. Alternatively, a feature amount may be extracted from each waveform data, and authenticity may be determined by comparing the feature amounts. A known technique is used to extract a feature amount. Hence, the comparison is done once or a plurality of times, as will be described next.

This will be explained in more detail.

(a) The primary function circuit of the LSI product or one or a plurality of dedicated circuits mounted there to generate a waveform for authenticity determination are operated under a predetermined condition, and the waveform of the power consumption or electromagnetic wave is measured.

(b) Measured waveform data is compared with one or a plurality of stored waveform data.

(c) A single or a plurality of conditions are used in the measurement environment including the power source voltage, the operation temperature, and the measurement device.

(d) Measurement under each condition is performed once or a plurality of times.

(e) Measured waveform data is compared directly or after having undergone feature extraction.

(f) The processing time may be extracted from the waveform data and compared. Alternatively, to measure the processing time, measurement may be done based on a signal output from the LSI product.

FIG. 2 is a graph showing the power waveforms of AES encryption circuits of three types of LSI products. LSI products, which perform the same logical operation but have undergone different LSI product manufacturing processes, output different analog data such as power consumptions or electromagnetic waves during the operation. FIG. 2 shows power waveforms obtained by operating, at the same frequency, LSI products made by different manufacturing processes from the source code of the same AES encryption circuit described in the Velrog-HDL language and monitoring their power lines. As is apparent from FIG. 2, if the manufacturing process changes, the power waveforms do not match even if the logical circuits are identical. On the other hand, the waveforms of LSI products manufactured at different times by the same manufacturing process match very well.

However, the measured waveform may change between LSI products manufactured at different times or using different wafers. To cope with such a case, waveform data may be acquired and managed for each lot of manufactured LSI products.

Not counterfeit products but defectives that do not meet various kinds of conditions such as a predetermined processing speed or rated power consumption and should be discarded may infiltrate into the distribution channels via some route. These items can also be detected at a high possibility by applying the authenticity determination method of the present invention, that is, by measuring the waveform of the power consumption or electromagnetic wave at the time of the operation and comparing the data with that of a legitimate channel item, as in authenticity determination.

As the dedicated circuit used to generate the waveform for authenticity determination, a ring oscillator or an LFSR (Linear Feedback Shift Register) circuit used to generate a pseudo random number can effectively be used. The oscillation frequency of a ring oscillator greatly affects the process characteristic, and a completely different frequency is exhibited of the manufacturing process changes. Note that the oscillation frequency is also largely affected by the power source voltage and the like. It is therefore possible to improve the determination accuracy by measuring the oscillation frequency under several conditions at the time of manufacturing or initialization and performing measurement and comparison under the plurality of conditions at the time of authenticity determination.

An LFSR circuit can generate large power consumption or electromagnetic wave suitable for observation because the switching count is very large. An antenna dedicated to efficiently generate an electromagnetic wave for inspection may be formed in the product by metal wiring. The antenna is an effective means for detecting a difference because its characteristic changes depending on the manufacturing process.

As described above, the electronic circuit component authenticity determination method of the present invention, that is, the method of operating a circuit under a predetermined condition at the time of manufacturing or initialization, storing waveform data, and comparing it later with waveform data operated under the predetermined condition is usable in technical fields such as (1) inspection of defective LSI products,
(2) countermeasures against imitations of various LSI products,
(3) preventing valuable data such as electronic money or an ID written in an IC card or the like from being stolen, written in an imitation, and used as well as protecting values of LSI products themselves, and
(4) application of PUF.

An example of the application to PUF will be described below in detail

A PUF product is a technique used to convert a physical variation between the devices of LSI products into digital data and use it as an ID (identification data), as described above. When the ID output for a circuit (to be referred to as a PUF circuit hereinafter) having a PUF function is fixed, the data can be copied for spoofing. To prevent this, normally, processing of inputting data of several ten bits called a challenge to the PUF circuit and causing the PUF circuit to return an answer of one to several bits called a response is repeated a plurality of times while changing the challenge.

The relationship between the challenge and the response changes between PUF circuits due to the variation between the devices and can therefore be used as an ID. A plurality of patterns of challenges and responses are acquired in advance for each PUF circuit and stored in a database on the authentication side. Counterfeiting is normally prevented by performing authentication while throwing away each pattern after one use.

However, in a simple PUF circuit, the input/output relationship may be known by checking several relationships between the challenge and the response. As a result, the PUF circuits tend to be increasingly complex. When the PUF circuits are complicated, the relationship between the challenge and the response becomes unstable in the individual PUF circuits. Hence, error correction codes are used as well.

The electronic circuit component authenticity determination method according to the present invention is also applicable to such a PUF circuit. FIG. 3 is a view for explaining an example of application of the electronic circuit component authenticity determination method according to the present invention to PUF. As shown in FIG. 3, a PUF circuit and a dedicated circuit used to generate power/electromagnetic wave for authenticity determination are used in combination. The PUF circuit can be simple if it can output an ID unique to each LSI of an LSI product, and the challenge-response need not be disposable. It is unlikely that an LSI product determined as a genuine by the electronic circuit component authenticity determination method of the present invention includes a non-certified circuit that counterfeits the ID of the PUF circuit. Hence, the ID output from the PUF circuit of the LSI product can immediately be determined as a genuine without using the challenge-response.

REFERENCE SIGNS LIST

11 ... LSI product
12 ... measurement device
13 ... storage device
14 ... comparator

The invention claimed is:

1. An electronic circuit component authenticity determination method, comprising:
operating an electronic circuit component under a predetermined condition at a time of manufacturing or initialization of the electronic circuit component, measuring a waveform of one of power consumption and an electromagnetic wave at a time of the operation, and storing the waveform as first waveform data;
operating an authenticity determination target electronic circuit component under the predetermined condition, measuring a waveform of one of power consumption and an electromagnetic wave, and temporarily storing the waveform as second waveform data; and
comparing the stored first waveform data with the second waveform data, determining that the electronic circuit component is a genuine when the waveform data match, and determining that the electronic circuit component is a counterfeit product when the waveform data are different.

2. The electronic circuit component authenticity determination method according to claim 1, wherein the electronic circuit component includes a circuit that operates under the predetermined condition and generates a predetermined waveform separately from a circuit of a primary function.

3. The electronic circuit component authenticity determination method according to claim 1, wherein the electronic circuit component operates all or some of circuits of a primary function, measures the waveform of one of the power consumption and the electromagnetic wave at the time of the operation, and stores the waveform as the first waveform data.

4. The electronic circuit component authenticity determination method according to claim 3, further comprising:
operating, for the authenticity determination target electronic circuit component, all or some of circuits of a primary function, under the predetermined condition, measuring the waveform of one of the power consumption and the electromagnetic wave, temporarily storing the waveform as the second waveform data; and
comparing the stored first waveform data with the second waveform data.

5. The electronic circuit component authenticity determination method according to claim 1, wherein the comparison between the first waveform data and the second waveform data is performed by extracted feature data after a predetermined feature has been extracted from the waveform data.

6. The electronic circuit component authenticity determination method according to claim 1, wherein the measurement of the waveform under the predetermined condition is performed a plurality of times under a plurality of predetermined conditions, and a plurality of waveform data are stored as the first waveform data.

7. The electronic circuit component authenticity determination method according to claim 6, wherein the measurement of the waveform under the predetermined condition for the authenticity determination target electronic circuit component is performed a plurality of times under a plurality of predetermined conditions, and the second waveform data are compared with the plurality of stored first waveform data.

8. An electronic circuit component that uses an electronic circuit component authenticity determination method of claim 1, comprising, as a circuit for authenticity determination of an electronic circuit component, a circuit that operates under a predetermined condition and generates a predetermined waveform separately from a circuit of a primary function.

9. The electronic circuit component that uses an electronic circuit component authenticity determination method according to claim 8, wherein the circuit provided separately from the circuit of the primary function as the circuit for authenticity determination of the electronic circuit component is a ring oscillator.

10. The electronic circuit component that uses an electronic circuit component authenticity determination method according to claim 8, wherein the circuit provided separately from the circuit of the primary function as the circuit for authenticity determination of the electronic circuit component is a linear feedback shift register.

* * * * *